US012738740B2

(12) United States Patent
Wu et al.

(10) Patent No.: US 12,738,740 B2
(45) Date of Patent: Sep. 15, 2026

(54) METHOD AND TERMINAL FOR CONFIGURING REACTIVE POWER CAPACITY OF A POWER GRID TO WHICH OFFSHORE WIND POWER IS CONNECTED ON A LARGE SCALE

(71) Applicants: STATE GRID FUJIAN ECONOMIC RESEARCH INSTITUTE, Fuzhou (CN); STATE GRID FUJIAN ELECTRIC POWER COMPANY LIMITED, Fuzhou (CN)

(72) Inventors: Wei Wu, Fuzhou (CN); Yuchen Tang, Fuzhou (CN); Yi Lin, Fuzhou (CN); Rui Zhu, Fuzhou (CN); Cangbi Ding, Fuzhou (CN); Chenyi Zheng, Fuzhou (CN); Yi Tang, Fuzhou (CN)

(73) Assignees: STATE GRID FUJIAN ECONOMIC RESEARCH INSTITUTE, Fuzhou (CN); STATE GRID FUJIAN ELECTRIC POWER COMPANY LIMITED, Fuzhou (CN)

( * ) Notice: Subject to any disclaimer, the term of this patent is extended or adjusted under 35 U.S.C. 154(b) by 110 days.

(21) Appl. No.: 19/007,079

(22) Filed: Dec. 31, 2024

(65) Prior Publication Data

US 2025/0183667 A1 Jun. 5, 2025

Related U.S. Application Data

(63) Continuation of application No. PCT/CN2024/134462, filed on Nov. 26, 2024.

(30) Foreign Application Priority Data

Dec. 4, 2023 (CN) ........................ 202311652731.X

(51) Int. Cl.
*H02J 3/18* (2026.01)
*H02J 3/001* (2026.01)
(Continued)

(52) U.S. Cl.
CPC .............. *H02J 3/18* (2013.01); *H02J 3/0012* (2020.01); *H02J 3/00125* (2020.01);
(Continued)

(58) Field of Classification Search
CPC ........ H02J 3/0012; H02J 3/00125; H02J 3/18; H02J 3/381; H02J 2101/28; H02J 2103/35
See application file for complete search history.

(56) References Cited

U.S. PATENT DOCUMENTS

| | | | | |
|---|---|---|---|---|
| 2011/0231320 A1* | 9/2011 | Irving | G06Q 30/08 | 713/300 |
| 2015/0295402 A1* | 10/2015 | Black | G05B 15/02 | 700/291 |

(Continued)

FOREIGN PATENT DOCUMENTS

| | | |
|---|---|---|
| CN | 102751729 A | 10/2012 |
| CN | 108400609 A | 8/2018 |

(Continued)

OTHER PUBLICATIONS

International Search Report for PCT/CN2024/134462 dated Mar. 10, 2025.

(Continued)

*Primary Examiner* — Jue Zhang
(74) *Attorney, Agent, or Firm* — MOSER TABOADA

(57) ABSTRACT

A method for configuring reactive power capacity of a power grid to which offshore wind power is connected on a large scale includes the following steps. Static voltage stability index of substations in a regional power grid to
(Continued)

which the offshore wind power is connected on the large scale and at multiple points and relative dynamic voltage drop area index for an N-2 fault are calculated. Thus, weak nodes in voltage stability are located, thereby implementing a prediction of a risk to the voltage stability of the regional power grid. These nodes are used as candidate reactive power compensation configuration nodes. An objective function is established as the minimum total cost of reactive power compensation devices at the candidate reactive power compensation configuration nodes. A multi-type reactive power optimization configuration model including static voltage stability constraints, voltage stability constraints under faulty state, and other constraints is solved.

18 Claims, 3 Drawing Sheets

(51) Int. Cl.

*H02J 3/0012* (2026.01)
*H02J 3/38* (2026.01)
*H02J 101/28* (2026.01)
*H02J 103/35* (2026.01)

(52) U.S. Cl.

CPC .......... *H02J 3/381* (2013.01); *H02J 2101/28* (2026.01); *H02J 2103/35* (2026.01)

(56) References Cited

U.S. PATENT DOCUMENTS

2017/0292498 A1* 10/2017 Garcia .................. F03D 7/0284
2021/0265841 A1* 8/2021 Brombach ............ F03D 7/0284

FOREIGN PATENT DOCUMENTS

| | | | |
|---|---|---|---|
| CN | 109038660 | A | 12/2018 |
| CN | 109103897 | A | 12/2018 |
| CN | 111799813 | A | 10/2020 |
| CN | 113193565 | A | 7/2021 |
| CN | 113595101 | A | 11/2021 |
| CN | 117856326 | A | 4/2024 |
| WO | WO 2014/173081 | A1 | 10/2014 |

OTHER PUBLICATIONS

Chinese Office Action for Application No. 202311652731.X dated Apr. 16, 2025.

Jiahui Wu et al., “Study on the Weak Point of Static Voltage of Transmission End in Hazheng UHVDC Transmission System and Reactive Power Compensation”, Power Capacitor & Reactive Power Compensation, Jun. 30, 2018, 7 pages, vol. 39, No. 3, DOI:10.14044/j.1674-1757.pcrpc.2018.03.025.

Zhu Weijun et al., “Two Stage Optimal Reactive Power Allocation of Power System with Wind Farm Considering Static Voltage Stability”, Power System & Automation, China Academic Journal Electronic Publishing House, Dec. 31, 2021, 6 pages, vol. 43, Issue 6, DOI:10.3969/j.issn.1000-3886.2021.06.017.

* cited by examiner

Calculate static voltage stability index of substations in a regional power grid to which the offshore wind power is connected on a large scale and at multiple points, and select weak points of static voltage stability based on the static voltage stability index of the substations

Perform an N-2 fault analysis on each of outgoing lines of the weak points of the static voltage stability, calculate relative dynamic voltage drop area index of the weak points of the static voltage stability, and select candidate reactive power compensation configuration nodes from the weak points of the static voltage stability based on the relative dynamic voltage drop area index

Use the minimum total cost of reactive power compensation devices configured at the candidate reactive power compensation configuration nodes as an objective function, and establish static voltage stability constraints, voltage stability constraints under faulty state, and other constraints to build a multi-type reactive power optimization configuration model considering large-scale connection of the offshore wind power

Solve the multi-type reactive power optimization configuration model to obtain an optimal reactive power capacity configuration result

FIG. 1

METHOD AND TERMINAL FOR CONFIGURING REACTIVE POWER CAPACITY OF A POWER GRID TO WHICH OFFSHORE WIND POWER IS CONNECTED ON A LARGE SCALE

CROSS-REFERENCES TO RELATED APPLICATIONS

This is a continuation of International Patent Application No. PCT/CN2024/134462, filed on Nov. 26, 2024, which claims priority to Chinese Patent Application No. 202311652731.X filed with the China National Intellectual Property Administration on Dec. 4, 2023, the disclosure of which is incorporated herein by reference in its entirety.

TECHNICAL FIELD

The present application relates to the technical field of power system planning and, in particular, to a method and a terminal for configuring reactive power capacity of a power grid to which offshore wind power is connected on a large scale.

BACKGROUND

In coastal provinces, offshore wind power is an important manner for generating electricity through renewable energy sources. Dense connection of offshore wind power may cause a local coastal power grid to transform from a receiving-end power grid to a hybrid power grid which serves as both a receiving end and a transmission end for transmitting offshore wind power on a large scale. As a result, the load on a particular transmission line is increased, posing a potential risk to voltage stability. However, at present, researches on a reactive voltage related to the transmission of offshore wind power are limited to transmission lines of offshore wind power. Sufficient consideration is not given to the problem about the voltage stability of an onshore power grid to which offshore wind power is connected on a large scale and at multiple points or demands for static and dynamic multi-type reactive power support in various scenarios such as normal operation and a severe fault.

SUMMARY

A technical problem to be solved by the present application is to provide a method and a terminal for configuring reactive power capacity of a power grid to which offshore wind power is connected on a large scale. Thus, a stable voltage and an economical reactive power configuration of a system with a high proportion of offshore wind power can be ensured.

To solve the preceding technical problem, the present application adopts the technical solution described below.

A method for configuring reactive power capacity of a power grid to which offshore wind power is connected on a large scale includes the steps described below.

Static voltage stability index of substations in a regional power grid to which the offshore wind power is connected on the large scale and at multiple points are calculated, and weak points of static voltage stability are selected based on the static voltage stability index of the substations.

An N-2 fault analysis is performed on each of outgoing lines of the weak points of static voltage stability, relative dynamic voltage drop area index of the weak points of static voltage stability are calculated, and candidate reactive power compensation configuration nodes are selected from the weak points of static voltage stability based on the relative dynamic voltage drop area index.

The minimum total cost of reactive power compensation devices configured at the candidate reactive power compensation configuration nodes is used as an objective function, and static voltage stability constraints, voltage stability constraints under faulty state, and other constraints are established so that a multi-type reactive power optimization configuration model considering large-scale connection of the offshore wind power is built.

The multi-type reactive power optimization configuration model is solved so that an optimal reactive power capacity configuration result is obtained.

To solve the preceding technical problem, the present application adopts another technical solution described below.

A terminal for configuring reactive power capacity of a power grid to which offshore wind power is connected on a large scale includes a memory, a processor, and a computer program stored in the memory and executable on the processor, where when executing the computer program, the processor performs the steps described below.

Static voltage stability index of substations in a regional power grid to which the offshore wind power is connected on the large scale and at multiple points are calculated, and weak points of static voltage stability are selected based on the static voltage stability index of the substations.

An N-2 fault analysis is performed on each of outgoing lines of the weak points of static voltage stability, relative dynamic voltage drop area index of the weak points of static voltage stability are calculated, and candidate reactive power compensation configuration nodes are selected from the weak points of static voltage stability based on the relative dynamic voltage drop area index.

The minimum total cost of reactive power compensation devices configured at the candidate reactive power compensation configuration nodes is used as an objective function, and static voltage stability constraints, voltage stability constraints under faulty state, and other constraints are established so that a multi-type reactive power optimization configuration model considering large-scale connection of the offshore wind power is built.

The multi-type reactive power optimization configuration model is solved so that an optimal reactive power capacity configuration result is obtained.

The present application has the beneficial effects described below. The static voltage stability index of the substations (nodes) in the regional power grid to which the offshore wind power is connected on the large scale and at the multiple points and the relative dynamic voltage drop area index for an N-2 fault are calculated. Thus, weak nodes in voltage stability in the system are located, thereby implementing a prediction of a risk to the voltage stability of the regional power grid. The candidate reactive power compensation configuration nodes of the reactive power optimization configuration model are selected from the weak nodes in the voltage stability. The objective function is established as the minimum total cost of the reactive power compensation devices at the candidate reactive power compensation configuration nodes. The multi-type reactive power optimization configuration model including the static voltage stability constraints, the voltage stability constraints in the faulty state, and the other constraints is solved. Thus, a configured static reactive power compensation meets a voltage regulation demand during normal operation of the power grid, and a configured dynamic reactive power compensation meets a demand for reactive power support in the event of a severe fault in an important transmission channel. In addition, the total cost of a reactive power compensation configuration is minimized so that a stable voltage and an economical reactive power configuration of the system with the high proportion of offshore wind power are ensured.

BRIEF DESCRIPTION OF DRAWINGS

FIG. 1 is a flowchart of a method for configuring reactive power capacity of a power grid to which offshore wind power is connected on a large scale according to an embodiment of the present application;

DETAILED DESCRIPTION

Figure 2:
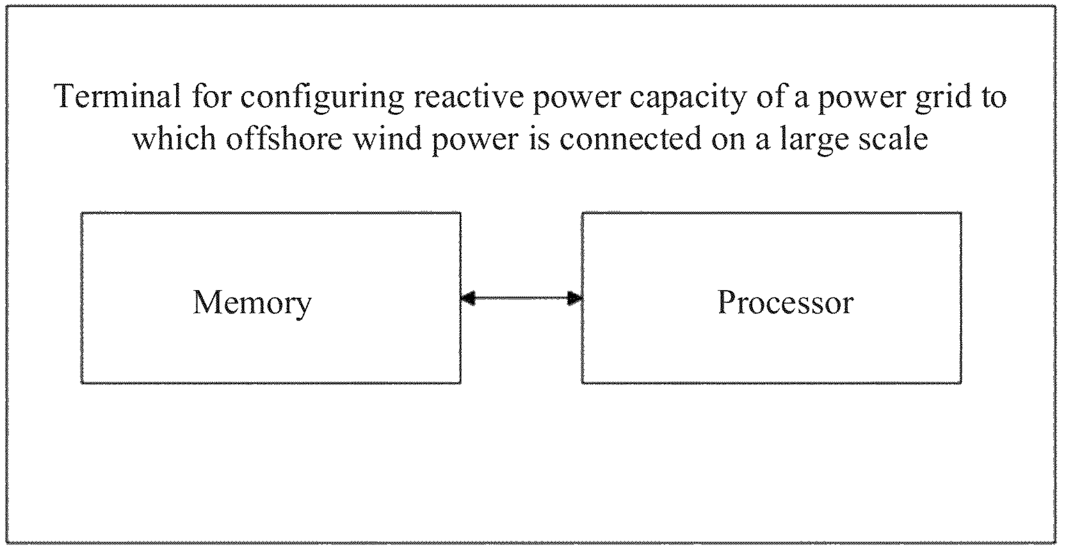
FIG. 2 is a structural diagram of a terminal for configuring reactive power capacity of a power grid to which offshore wind power is connected on a large scale according to an embodiment of the present application.

To describe the technical content and achieved objects and effects of the present application in detail, the following description is given in conjunction with embodiments and

DRAWINGS

Referring to FIG. 1, a method for configuring reactive power capacity of a power grid to which offshore wind power is connected on a large scale includes the steps described below.

Static voltage stability index of substations in a regional power grid to which the offshore wind power is connected on the large scale and at multiple points are calculated, and weak points of static voltage stability are selected based on the static voltage stability index of the substations.

An N-2 fault analysis is performed on each of outgoing lines of the weak points of static voltage stability, relative dynamic voltage drop area index of the weak points of static voltage stability are calculated, and candidate reactive power compensation configuration nodes are selected from the weak points of static voltage stability based on the relative dynamic voltage drop area index.

The minimum total cost of reactive power compensation devices configured at the candidate reactive power compensation configuration nodes is used as an objective function, and static voltage stability constraints, voltage stability constraints under faulty state, and other constraints are established so that a multi-type reactive power optimization configuration model considering large-scale connection of the offshore wind power is built.

The multi-type reactive power optimization configuration model is solved so that an optimal reactive power capacity configuration result is obtained.

As can be seen from the preceding description, the present application has the beneficial effects described below. The static voltage stability index of the substations (nodes) in the regional power grid to which the offshore wind power is connected on the large scale and at the multiple points and the relative dynamic voltage drop area index for an N-2 fault are calculated. Thus, weak nodes in voltage stability in a system are located, thereby implementing a prediction of a risk to the voltage stability of the regional power grid. The candidate reactive power compensation configuration nodes of the reactive power optimization configuration model are selected from the weak nodes in the voltage stability. The objective function is established as the minimum total cost of the reactive power compensation devices at the candidate reactive power compensation configuration nodes. The multi-type reactive power optimization configuration model including the static voltage stability constraints, the voltage stability constraints in the faulty state, and the other constraints is solved. Thus, a configured static reactive power compensation meets a voltage regulation demand during normal operation of the power grid, and a configured dynamic reactive power compensation meets a demand for reactive power support in the event of a severe fault in an important transmission channel. In addition, the total cost of a reactive power compensation configuration is minimized so that a stable voltage and an economical reactive power configuration of a system with a high proportion of offshore wind power are ensured.

Further, calculating the static voltage stability index of the substations in the regional power grid to which the offshore wind power is connected on the large scale and at the multiple points includes the steps described below.

A statistical calculation is performed on transmission nodes corresponding to the substations in the regional power grid to which the offshore wind power is connected on the large scale and at the multiple points, and a typical operating condition of offshore wind farms is determined.

A node admittance matrix is built according to the transmission nodes, and a state equation of the typical operating condition of the offshore wind farms is generated according to the node admittance matrix.

A system power flow equation of the typical operating condition of the offshore wind farms is established based on the state equation of the typical operating condition of the offshore wind farms.

The system power flow equation of the typical operating condition of the offshore wind farms is solved so that transmission apparent power of the substations is obtained.

The static voltage stability index of the substations is calculated according to the transmission apparent power of the substations.

Further, the static voltage stability index of the substations are calculated according to the transmission apparent power of the substations through the following formula:

$$L_j = \frac{\left|\sum_{i \in \alpha_L} \frac{Z_{ij}^* \tilde{S}_i}{U_i}\right|}{|U_j|};$$

where $L_j$ represents a static voltage stability index of a substation j, $$Z_{ij}^*$$

represents the conjugation of the mutual impedance between the substation j and a substation i adjacent to the substation j, $\tilde{S}_i$ represents transmission apparent power of the substation i adjacent to the substation j, $U_i$ represents a bus voltage vector of the substation i adjacent to the substation j, $|U_j|$ represents a voltage amplitude of the substation j, and $\alpha_L$ represents a set of substations adjacent to the substation j.

As can be seen from the preceding description, the static voltage stability index characterizes the voltage stability of a substation under normal operating conditions. This index is conducive to subsequently locating the weak points of static voltage stability accurately.

Further, selecting the weak points of static voltage stability based on the static voltage stability index of the substations includes the steps described below.

The average value of the static voltage stability index is obtained according to the static voltage stability index of the substations.

Target substations with a static voltage stability index greater than the average value of the static voltage stability index are selected from the substations, and the target substations are identified as weak points of static voltage stability.

As can be seen from the preceding description, the target substations with the static voltage stability index greater than the average value of the static voltage stability index are selected from the substations, and the target substations are identified as the weak points of static voltage stability, thereby implementing a more reasonable and reliable prediction of the risk to the voltage stability.

Further, performing the N-2 fault analysis on each of the outgoing lines of the weak points of static voltage stability, calculating the relative dynamic voltage drop area index of the weak points of static voltage stability, and selecting the candidate reactive power compensation configuration nodes from the weak points of static voltage stability based on the relative dynamic voltage drop area index includes the steps described below.

An adjacent node of each of the weak points of static voltage stability and an N-2 fault disturbance operating condition of each of the weak points of static voltage stability are determined, and a relative dynamic voltage drop area index of each of the weak points of static voltage stability subjected to a fault disturbance is calculated.

The relative dynamic voltage drop area index of the weak points of static voltage stability are sorted in descending order, and a preset top percentage of the weak points of static voltage stability are selected as the candidate reactive power compensation configuration nodes according to the sorted relative dynamic voltage drop area index.

As can be seen from the preceding description, the higher the relative dynamic voltage drop area index of a node, the lower the voltage stability level of the node under a severe fault and the greater the impact of the node on the voltage stability of adjacent nodes. Through the preceding steps, a weak point in the voltage stability under the (static) condition of normal operation and a weak point in the voltage stability under the condition of a severe fault can be located. Since reactive power needs to be balanced in situ, a reactive power compensation configured at the weak point in the voltage stability is the most effective. In addition, the scale of the subsequent optimization model can be reduced, improving solving efficiency.

Further, the minimum total cost of the reactive power compensation devices configured at the candidate reactive power compensation configuration nodes is used as the objective function, and the minimum total cost is as follows:

$$\min OF=\sum_{k=1}^{N_k} C_1 * Q_{c1\_k} + C_2 * Q_{c2\_k};$$

where OF represents the total cost of the reactive power compensation devices configured at the candidate reactive power compensation configuration nodes, $N_k$ represents the total number of the candidate reactive power compensation configuration nodes, $C_1$ represents the unit capacity construction cost of a static reactive power compensation device, $Q_{c1\_k}$ represents the capacity of a static reactive power compensation device at the k-th candidate reactive power compensation configuration node, $C_2$ represents the unit capacity construction cost of a dynamic reactive power compensation device, and $Q_{c2\_k}$ represents the capacity of a dynamic reactive power compensation device at the k-th candidate reactive power compensation configuration node.

As can be seen from the preceding description, the minimum total cost of the reactive power compensation devices configured at the candidate reactive power compensation configuration nodes is used as the objective function so that the cost of a reactive power configuration can be minimized, thereby making the reactive power configuration more economical.

Further, the static voltage stability constraints include a power flow constraint and a node voltage constraint of the typical operating condition of the offshore wind farms.

The power flow constraint of the typical operating condition of the offshore wind farms is as follows:

$$\text{flow s.t.} = \begin{cases} P_p + \sum_{q\in\Phi_{(:,p)}} \left(P_{qp} - \frac{P_{qp}^2+Q_{qp}^2}{U_q^2} R_{qp}\right) = \sum_{t\in\Phi_{(p,:)}} P_{pt}, & \forall\, p \in \Psi \\ Q_p + \sum_{q\in\Phi_{(:,p)}} \left(Q_{qp} - \frac{P_{qp}^2+Q_{qp}^2}{U_q^2} X_{qp}\right) = \sum_{t\in\Phi_{(p,:)}} Q_{pt}, & \forall\, p \in \Psi \end{cases};$$

where $P_p$ represents the net injection amount of active power at a node p, $P_{qp}$ represents active power on a branch qp, $U_q$ represents a voltage of a node q, $Q_{qp}$ represents reactive power on the branch qp, $R_{qp}$ represents equivalent resistance of the branch qp, $P_{pt}$ represents active power on a branch pt, Ψ represents a set of alternating current nodes in the system, $\Phi_{(p,:)}$ represents a set of branches using the node p as a start node, $\Phi_{(:,p)}$ represents a set of branches using the node p as an end node, $Q_p$ represents the net injection amount of reactive power at the node p, $X_{qp}$ represents equivalent reactance of the branch qp, and $Q_{pt}$ represents reactive power on the branch pt.

The node voltage constraint is as follows:

$$-0.05 < \frac{U_q - U_{qN}}{U_{qN}} < 0.05;$$

where $U_{qN}$ represents the rated operating voltage of the node q.

As can be seen from the preceding description, with the power flow constraint and the node voltage constraint of the typical operating condition of the offshore wind farms, a demand for a static reactive power compensation configuration during the normal operation can be calculated. Thus, the voltage stability of the power grid is improved.

Further, the voltage stability constraints in the faulty state include the step described below.

An N-2 fault check is performed on any important transmission channel in the system through the following formula:

$$\sum_{x=1}^{m}\int_{t_{end}^{x}}^{t_{start}^{x}}(0.8-U_i^x(t))dt<A_{i,set};$$

where $A_{i,set}$ represents a threshold value of a critical transient voltage drop area of a node i, $$t_{start}^{x}$$

represents the moment at which a voltage drops to 0.8 p.u. for the x-th time under a certain fault, $$t_{end}^{x}$$

represents the moment at which the voltage is restored to above 0.8 p.u. for the x-th time under a certain fault, $$U_i^x(t)$$

represents a voltage trace curve of the node i with the voltage dropping below 0.8 p.u. for the x-th time under a certain fault, m represents the total number of curves with a voltage of below 0.8 p.u. under a certain fault, and x represents the number of times the voltage trace curve drops below 0.8 p.u. under a certain fault.

The other constraints include a capacity constraint for a reactive power compensation device.

The capacity constraint for the reactive power compensation device is as follows:

$$Q_{c1\_k\_min}<Q_{c1\_k}<Q_{c1\_k\_max};$$

$$Q_{c2\_k\_min}<Q_{c2\_k}<Q_{c2\_k\_max};$$

where $Q_{c1\_k\_min}$ represents a lower limit of the capacity configured for the static reactive power compensation device at the k-th candidate reactive power compensation configuration node, $Q_{c1\_k\_max}$ represents an upper limit of the capacity configured for the static reactive power compensation device at the k-th candidate reactive power compensation configuration node, $Q_{c2\_k\_min}$ represents a lower limit of the capacity configured for the dynamic reactive power compensation device at the k-th candidate reactive power compensation configuration node, and $Q_{c2\_k\_max}$ represents an upper limit of the capacity configured for the dynamic reactive power compensation device at the k-th candidate reactive power compensation configuration node.

As can be seen from the preceding description, for a considerable disturbance, with the dynamic voltage stability constraints and the capacity constraint for the reactive power compensation device, a demand for dynamic reactive power support capacity during the severe fault is calculated. Thus, the voltage stability of the power grid is improved.

Further, solving the multi-type reactive power optimization configuration model to obtain the optimal reactive power capacity configuration result includes the step described below.

The multi-type reactive power optimization configuration model is solved through a particle swarm optimization algorithm based on the objective function under the static voltage stability constraints, the voltage stability constraints in the faulty state, and the other constraints so that optimal capacity of each of static reactive power compensation devices and optimal capacity of each of dynamic reactive power compensation devices configured at the candidate reactive power compensation configuration nodes are obtained.

As can be seen from the preceding description, both a demand for a reactive power compensation during the normal operation and a demand for dynamic voltage support during the severe fault of the power grid are considered. Thus, the stable voltage and economical reactive power configuration of the system with the high proportion of offshore wind power are ensured.

Referring to FIG. 2, another embodiment of the present application provides a terminal for configuring reactive power capacity of a power grid to which offshore wind power is connected on a large scale. The terminal includes a memory, a processor, and a computer program stored in the memory and executable on the processor. When executing the computer program, the processor performs the steps of the preceding method for configuring the reactive power capacity of the power grid to which the offshore wind power is connected on the large scale.

In the present application, the preceding method and terminal for configuring the reactive power capacity of the power grid to which the offshore wind power is connected on the large scale are applicable to the scenario where a regional power grid to which offshore wind power is connected on a large scale and at multiple points is planned. The description is performed below through embodiments.

Figure 3:
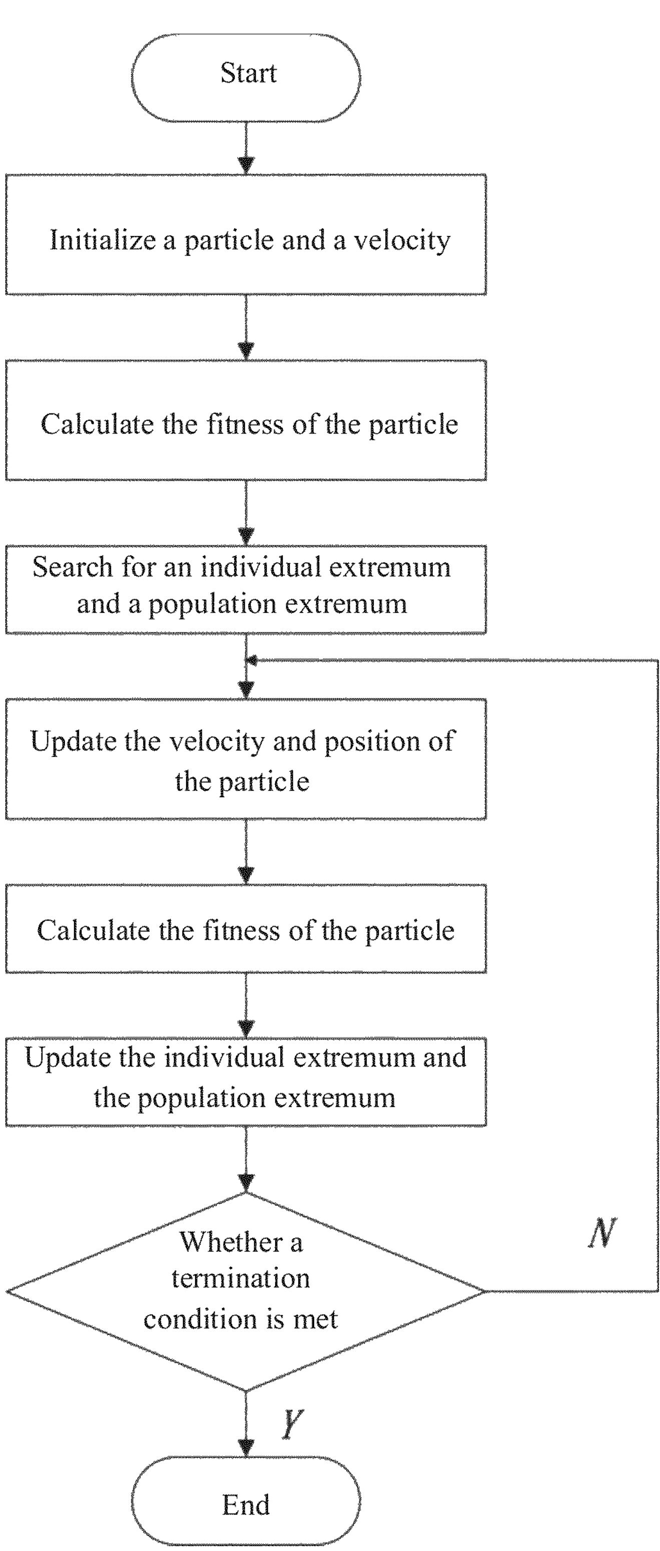
FIG. 3 is a flowchart of a particle swarm optimization algorithm in a method for configuring reactive power capacity of a power grid to which offshore wind power is connected on a large scale according to an embodiment of the present application.

With reference to FIGS. 1 and 3, embodiment one of the present application is described below.

A method for configuring reactive power capacity of a power grid to which offshore wind power is connected on a large scale includes the steps below.

In S1, static voltage stability index of substations in a regional power grid to which the offshore wind power is connected on the large scale and at multiple points are calculated, and weak points of static voltage stability are selected based on the static voltage stability index of the substations. S1 specifically includes S11 to S17.

In S11, a statistical calculation is performed on transmission nodes corresponding to the substations in the regional power grid to which the offshore wind power is connected on the large scale and at the multiple points, and a typical operating condition of offshore wind farms is determined.

In S12, a node admittance matrix is built according to the transmission nodes, and a state equation of the typical operating condition of the offshore wind farms is generated according to the node admittance matrix.

The state equation of the typical operating condition of the offshore wind farms is specifically as follows:

$$\begin{bmatrix} I_L \\ I_G \end{bmatrix} = \begin{bmatrix} Y_{LL} & Y_{LG} \\ Y_{GL} & Y_{GG} \end{bmatrix} \begin{bmatrix} U_L \\ U_G \end{bmatrix};$$

where $I_L$ represents a current vector injected into a transmission node of the typical operating condition of the offshore wind farms, $I_G$ represents a current vector injected into a power node of the typical operating condition of the offshore wind farms, $Y_{LL}$ represents a self-admittance of the transmission node of the typical operating condition of the offshore wind farms, $Y_{LG}$ represents a mutual admittance from the transmission node to the power node of the typical operating condition of the offshore wind farms, $Y_{GL}$ represents a mutual admittance from the power node to the transmission node of the typical operating condition of the offshore wind farms, $Y_{GG}$ represents a self-admittance of the power node of the typical operating condition of the offshore wind farms, $U_L$ represents a voltage vector of the transmission node of the typical operating condition of the offshore wind farms, and $U_G$ represents a voltage vector of the power node of the typical operating condition of the offshore wind farms.

In S13, a system power flow equation of the typical operating condition of the offshore wind farms is established based on the state equation of the typical operating condition of the offshore wind farms, which is specifically as follows:

$$\text{flow s.t.} = \begin{cases} P_p + \sum_{q\in\Phi_{(:,p)}} \left(P_{qp} - \frac{P_{qp}^2 + Q_{qp}^2}{U_q^2} R_{qp}\right) = \sum_{t\in\Phi_{(p,:)}} P_{pt}, & \forall\, p \in \Psi \\ Q_p + \sum_{q\in\Phi_{(:,p)}} \left(Q_{qp} - \frac{P_{qp}^2 + Q_{qp}^2}{U_q^2} X_{qp}\right) = \sum_{t\in\Phi_{(p,:)}} Q_{pt}, & \forall\, p \in \Psi \end{cases}.$$

For an offshore wind power grid connection node, the formulas are as follows:

$$\begin{cases} P_{wp} = P_{w\_max} \\ Q_{wp} = P_{w\_max}\tan\theta_w \end{cases};$$

where $P_{wp}$ represents an active power injection at the offshore wind power grid connection node of the typical operating condition of the offshore wind farms, $Q_{wp}$ represents a reactive power injection at the offshore wind power grid connection node of the typical operating condition of the offshore wind farms, $P_{w\_max}$ represents power output data of the typical operating condition of the offshore wind farms, and $\theta_w$ represents a power factor of a power output of the offshore wind farms.

In S14, the system power flow equation of the typical operating condition of the offshore wind farms is solved so that transmission apparent power of the substations, that is, the power flow distribution of the substations (nodes), is obtained through the following formula:

$$\tilde{S}_j = \sum_{a=1}^{A} P_a + jQ_a;$$

where $\tilde{S}_j$ represents apparent power transmitted from a node j to an adjacent node to the node j, A represents a set of nodes adjacent to the node j, $P_a$ represents the active power transmitted from the node j to a node a, and $Q_a$ represents reactive power transmitted from the node j to the node a.

In S15, the static voltage stability index of the substations are calculated according to the transmission apparent power of the substations through the following formula:

$$L_j = \frac{\left|\sum_{i\in\alpha_L} \frac{Z_{ij}^* \tilde{S}_i}{U_i}\right|}{|U_j|};$$

where $L_j$ represents a static voltage stability index of a substation j, $$Z_{ij}^*$$

represents the conjugation of the mutual impedance between the substation j and a substation i adjacent to the substation j, $\tilde{S}_i$ represents transmission apparent power of the substation i adjacent to the substation j, $U_i$ represents a bus voltage vector of the substation i adjacent to the substation j, $|U_j|$ represents a voltage amplitude of the substation j, and $\alpha_L$ represents a set of substations adjacent to the substation j.

In S16, the average value of the static voltage stability index is obtained according to the static voltage stability index of the substations.

In S17, target substations with a static voltage stability index greater than the average value of the static voltage stability index are selected from the substations, and the target substations are identified as weak points of static voltage stability.

In S2, an N-2 fault analysis is performed on each of outgoing lines of the weak points of static voltage stability, relative dynamic voltage drop area index of the weak points of static voltage stability are calculated, and candidate reactive power compensation configuration nodes are selected from the weak points of static voltage stability based on the relative dynamic voltage drop area index. S2 specifically includes S21 to S23.

In S21, the adjacent node of each of the weak points of static voltage stability and the N-2 fault disturbance operating condition of each of the weak points of static voltage stability are determined.

In S22, the relative dynamic voltage drop area index of each of the weak points of static voltage stability subjected to the fault disturbance is calculated. S22 specifically includes S221 and S222.

In S221, a dynamic voltage drop area of each adjacent node under each N-2 fault disturbance operating condition is calculated through the following formula:

$$S_{RTVDAI,i} = \int_{t'_{end}}^{t'_{start}} (u_{i\_N} - u_i(t))dt;$$

where $S_{RTVDAI,i}$ represents a dynamic voltage drop area of each adjacent node i under each N-2 fault disturbance operating condition, $t'_{start}$ represents the moment at which the voltage of the adjacent node i drops to 80% of the rated voltage of the adjacent node i for the first time, $t'_{end}$ represents the moment at which the voltage of the adjacent node i drops to or below 80% of the rated voltage of the adjacent node i and is restored to and maintained at or above 80% of the rated voltage of the adjacent node i, $u_{i\_N}$ represents the rated voltage of the adjacent node i, and $u_i(t)$ represents a voltage trace curve of the node i under a fault.

In S222, the relative dynamic voltage drop area index of each of the weak points of static voltage stability is calculated through the following formulas:

$$S_{RTVDAI,j}(f) = \sum\nolimits_{i=1}^{M} S_{RTVDAI,i};$$

$$I_{RTVDAI,j} = \max\{S_{RTVDAI}(1), S_{RTVDAI}(2), \ldots, S_{RTVDAI}(F)\};$$

where $S_{RTVDAI,j}(f)$ represents dynamic voltage drop areas of all nodes adjacent to a weak point j in the static voltage stability under a fault f, M represents the number of the nodes adjacent to the weak point j in the static voltage stability, and F represents the number of checked faults of the weak point j in the static voltage stability, and $I_{RTVDAI,j}$ represents a relative dynamic voltage drop area index of the weak point j in the static voltage stability, which is the maximum value of $S_{RTVDAI,j}(f)$ under the checked faults.

In S23, the relative dynamic voltage drop area index of the weak points of static voltage stability are sorted in descending order, and a preset top percentage of the weak points of static voltage stability are selected as the candidate reactive power compensation configuration nodes according to the sorted relative dynamic voltage drop area index.

In an optional embodiment, the preset percentage is 10%.

Specifically, the weak points of static voltage stability corresponding to the top 10% of the sorted relative dynamic voltage drop area index are selected as the candidate reactive power compensation configuration nodes.

A weak point in the voltage stability under the (static) condition of normal operation and a weak point in the voltage stability under the condition of a severe fault can be located. Since reactive power needs to be balanced in situ, a reactive power compensation configured at the weak point in the static voltage stability is the most effective. In addition, the scale of the optimization model can be reduced, improving solving efficiency.

In S3, the minimum total cost of reactive power compensation devices configured at the candidate reactive power compensation configuration nodes is used as an objective function, and static voltage stability constraints, voltage stability constraints under faulty state, and other constraints are established so that a multi-type reactive power optimization configuration model considering large-scale connection of the offshore wind power is built.

A local power grid to which offshore wind power is connected on a large scale is required to provide a reactive power compensation for normal operation during large-scale wind power transmission. In addition, the local power grid should also have a reactive power support capability in the event of a severe fault in an important transmission channel. With the static voltage stability constraints, a demand for a static reactive power compensation configuration during the normal operation is calculated. With the voltage stability constraints in the faulty state, a demand for dynamic reactive power support capacity during the severe fault is calculated. Thus, the voltage stability of the power grid is improved, and the cost of a reactive power configuration is minimized.

The minimum total cost of the reactive power compensation devices configured at the candidate reactive power compensation configuration nodes is used as the objective function, and the minimum total cost is as follows:

$$\min OF=\sum_{k=1}^{N_k} C_1 * Q_{c1\_k} + C_2 * Q_{c2\_k};$$

where OF represents the total cost of the reactive power compensation devices configured at the candidate reactive power compensation configuration nodes, $N_k$ represents the total number of the candidate reactive power compensation configuration nodes, $C_1$ represents the unit capacity construction cost of a static reactive power compensation device, $Q_{c1\_k}$ represents the capacity of a static reactive power compensation device at the k-th candidate reactive power compensation configuration node, $C_2$ represents the unit capacity construction cost of a dynamic reactive power compensation device, and $Q_{c2\_k}$ represents the capacity of a dynamic reactive power compensation device at the k-th candidate reactive power compensation configuration node.

The static voltage stability constraints include a power flow constraint and a node voltage constraint of the typical operating condition of the offshore wind farms.

The power flow constraint of the typical operating condition of the offshore wind farms is as follows:

$$\text{flow s.t.} = \begin{cases} P_p + \sum_{q\in\Phi_{(:,p)}} \left(P_{qp} - \frac{P_{qp}^2+Q_{qp}^2}{U_q^2} R_{qp}\right) = \sum_{t\in\Phi_{(p,:)}} P_{pt}, & \forall\, p\in\Psi \\ Q_p + \sum_{q\in\Phi_{(:,p)}} \left(Q_{qp} - \frac{P_{qp}^2+Q_{qp}^2}{U_q^2} X_{qp}\right) = \sum_{t\in\Phi_{(p,:)}} Q_{pt}, & \forall\, p\in\Psi \end{cases};$$

where $P_p$ represents the net injection amount of active power at a node p, $P_{qp}$ represents active power on a branch qp, $U_q$ represents a voltage of a node q, $Q_{qp}$ represents reactive power on the branch qp, $R_{qp}$ represents equivalent resistance of the branch qp, $P_{pt}$ represents active power on a branch pt, $\Psi$ represents a set of alternating current nodes in a system, $\Phi_{(p,:)}$ represents a set of branches using the node p as a start node, $\Phi_{(:,p)}$ represents a set of branches using the node p as an end node, $Q_p$ represents the net injection amount of reactive power at the node p, $X_{qp}$ represents equivalent reactance of the branch qp, and $Q_{pt}$ represents reactive power on the branch pt.

The power expression for each node is as follows:

$$\begin{cases} P_p = P_{p1} - P_{p2} \\ Q_p = Q_{p1} - Q_{p2} \end{cases};$$

where $P_{p1}$ represents an active power output of the node p, $P_{p2}$ represents an active load of the node p, $Q_{p1}$ represents a reactive power output of the node p, and $Q_{p2}$ represents a reactive load of the node p.

The reactive power expression for the candidate reactive power compensation configuration node k is as follows:

$$Q_p = Q_k + Q_{c1\_k};$$

where $Q_k$ represents the reactive power originally injected into the candidate reactive power compensation configuration node k.

The node voltage constraint is as follows:

$$-0.05 < \frac{U_q - U_{qN}}{U_{qN}} < 0.05;$$

where $U_{qN}$ represents a rated operating voltage of the node q.

The voltage stability constraints in the faulty state include the step described below.

An N-2 fault check is performed on any important transmission channel in the system through the following formula:

$$\sum_{x=1}^{m} \int_{t_{end}^x}^{t_{start}^x} (0.8 - U_i^x(t))dt < A_{i,set};$$

where $A_{i,set}$ represents a threshold value of a critical transient voltage drop area of a node i, $$t_{start}^{x}$$

represents the moment at which a voltage drops to 0.8 p.u. for the x-th time under a certain fault, $$t_{end}^{x}$$

represents the moment at which the voltage is restored to above 0.8 p.u. for the x-th time under a certain fault, $$U_i^x(t)$$

represents a voltage trace curve of the node i with the voltage dropping below 0.8 p.u. for the x-th time under a certain fault, m represents the total number of curves with a voltage of below 0.8 p.u. under a certain fault, and x represents the number of times the voltage trace curve drops below 0.8 p.u. under a certain fault.

The specific manner of calculating $A_{i,set}$ is described below.

A simulation of multiple types of faults is performed on the node i in advance, and the critical value of the maximum voltage drop area under the condition of voltage stability is selected through the following formula:

$$A_{i,set} = \max\{A_{1,i,set}, A_{2,i,set}, \ldots , A_{z,i,set}\};$$

where $A_{z,i,set}$ represents the integral value of the voltage drop area under the z-th type of fault.

The maximum power output constraint of the dynamic reactive power compensation device configured at the k-th candidate reactive power compensation configuration node in a dynamic process is as follows:

$$Q_{c2\_k} = \max\{Q'_{ck(t)}, t \in [t_{start1}, t_{end1}]\}.$$

$$Q'_{ck(t)}$$

is expressed as follows:

$$Q'_{ck(t)} = U'_{ck(t)}\frac{U'_{ck(t)} - U_{k(t)}}{\omega L};$$

where $$Q'_{ck(t)}$$

represents a reactive output of the dynamic reactive power compensation device at the k-th candidate reactive power compensation configuration node during a disturbance, $t_{start1}$ represents the start time of the dynamic process, $t_{end1}$ represents the end time of the dynamic process, $$U'_{ck(t)}$$

represents an output voltage of the dynamic reactive power compensation device configured at the k-th candidate reactive power compensation configuration node during the disturbance, $U_{k(t)}$ represents a voltage of the k-th candidate reactive power compensation configuration node during the disturbance, ω represents a system angular velocity, and L represents an inductance value of a connecting reactor.

The other constraints include a capacity constraint for a reactive power compensation device, which is specifically as follows:

$$Q_{c1\_k\_min} < Q_{c1\_k} < Q_{c1\_k\_max};$$

$$Q_{c2\_k\_min} < Q_{c2\_k} < Q_{c2\_k\_max};$$

where $Q_{c1\_k\_min}$ represents a lower limit of the capacity configured for the static reactive power compensation device at the k-th candidate reactive power compensation configuration node, $Q_{c1\_k\_max}$ represents an upper limit of the capacity configured for the static reactive power compensation device at the k-th candidate reactive power compensation configuration node, $Q_{c2\_k\_min}$ represents a lower limit of the capacity configured for the dynamic reactive power compensation device at the k-th candidate reactive power compensation configuration node, and $Q_{c2\_k\_max}$ represents an upper limit of the capacity configured for the dynamic reactive power compensation device at the k-th candidate reactive power compensation configuration node.

In S4, the multi-type reactive power optimization configuration model is solved so that an optimal reactive power capacity configuration result is obtained.

Specifically, the multi-type reactive power optimization configuration model is solved through a particle swarm optimization algorithm based on the objective function under the static voltage stability constraints, the voltage stability constraints in the faulty state, and the other constraints so that optimal capacity of each of static reactive power compensation devices and optimal capacity of each of dynamic reactive power compensation devices configured at the candidate reactive power compensation configuration nodes are obtained. The flow of the particle swarm optimization algorithm is shown in FIG. 3.

With reference to FIG. 2, embodiment two of the present application is described below.

A terminal for configuring reactive power capacity of a power grid to which offshore wind power is connected on a large scale includes a memory, a processor, and a computer program stored in the memory and executable on the processor. When executing the computer program, the processor performs the steps of the method for configuring the reactive power capacity of the power grid to which the offshore wind power is connected on the large scale in embodiment one.

In summary, the present application provides the method and the terminal for configuring the reactive power capacity of the power grid to which the offshore wind power is connected on the large scale. The static voltage stability index of the substations (nodes) in the regional power grid to which the offshore wind power is connected on the large scale and at the multiple points and the relative dynamic voltage drop area index for the N-2 fault are calculated. Thus, the weak nodes in the voltage stability in the system are located, thereby implementing the prediction of the risk to the voltage stability of the regional power grid. The candidate reactive power compensation configuration nodes of the reactive power optimization configuration model are selected from the weak nodes in the voltage stability. The objective function is established as the minimum total cost of the reactive power compensation devices at the candidate reactive power compensation configuration nodes. The multi-type reactive power optimization configuration model including the static voltage stability constraints, the voltage stability constraints in the faulty state, and the other constraints is solved. Thus, the configured static reactive power compensation meets the voltage regulation demand during the normal operation of the power grid, and the configured dynamic reactive power compensation meets the demand for the reactive power support in the event of the severe fault in the important transmission channel. In addition, the total cost of the reactive power compensation configuration is minimized so that the stable voltage and economical reactive power configuration of the system with the high proportion of offshore wind power are ensured. In addition, the higher the relative dynamic voltage drop area index of a node, the lower the voltage stability level of the node under the severe fault. The weak point in the voltage stability under the (static) condition of the normal operation and the weak point in the voltage stability under the condition of the severe fault can be located. Since reactive power needs to be balanced in situ, the reactive power compensation configured at the weak point in the voltage stability is the most effective. In addition, the scale of the subsequent optimization model can be reduced, improving the solving efficiency.

The above are only embodiments of the present application and not intended to limit the scope of the present application. Any equivalent variation made on the basis of the specification and the drawings of the present application, or direct or indirect utilization in relevant fields all fall within the scope of the present application.

The invention claimed is:

1. A method for configuring reactive power capacity of a power grid to which offshore wind power is connected on a large scale, comprising the following steps:

calculating static voltage stability index of substations in a regional power grid to which the offshore wind power is connected on the large scale and at multiple points, and selecting weak points of static voltage stability based on the static voltage stability index of the substations;

performing an N-2 fault analysis on each of outgoing lines of the weak points of static voltage stability, calculating relative dynamic voltage drop area index of the weak points of static voltage stability, and selecting candidate reactive power compensation configuration nodes from the weak points of static voltage stability based on the relative dynamic voltage drop area index;

using a minimum total cost of reactive power compensation devices configured at the candidate reactive power compensation configuration nodes as an objective function, and establishing static voltage stability constraints, voltage stability constraints under faulty state, and other constraints to build a multi-type reactive power optimization configuration model considering large-scale connection of the offshore wind power; and solving the multi-type reactive power optimization configuration model to obtain an optimal reactive power capacity configuration result.

2. The method for configuring the reactive power capacity of the power grid to which the offshore wind power is connected on the large scale according to claim 1, wherein calculating the static voltage stability index of the substations in the regional power grid to which the offshore wind power is connected on the large scale and at the multiple points comprises:

performing a statistical calculation on transmission nodes corresponding to the substations in the regional power grid to which the offshore wind power is connected on the large scale and at the multiple points, and determining a typical operating condition of offshore wind farms;

building a node admittance matrix according to the transmission nodes, and generating a state equation of the typical operating condition of the offshore wind farms according to the node admittance matrix;

establishing a system power flow equation of the typical operating condition of the offshore wind farms based on the state equation of the typical operating condition of the offshore wind farms;

solving the system power flow equation of the typical operating condition of the offshore wind farms to obtain transmission apparent power of the substations; and calculating the static voltage stability index of the substations according to the transmission apparent power of the substations.

3. The method for configuring the reactive power capacity of the power grid to which the offshore wind power is connected on the large scale according to claim 2, wherein the static voltage stability index of the substations are calculated according to the transmission apparent power of the substations through the following formula:

$$L_j = \frac{\left|\sum_{i \in \alpha_L} \frac{Z_{ij}^* \tilde{S}_i}{U_i}\right|}{|U_j|};$$

wherein $L_j$ represents a static voltage stability index of a substation j, $Z_{ij}^*$ represents conjugation of mutual impedance between the substation j and a substation i adjacent to the substation j, $\tilde{S}_i$ represents transmission apparent power of the substation i adjacent to the substation j, $U_i$ represents a bus voltage vector of the substation i adjacent to the substation j, $|U_j|$ represents a voltage amplitude of the substation j, and $\alpha_L$ represents a set of substations adjacent to the substation j.

4. The method for configuring the reactive power capacity of the power grid to which the offshore wind power is connected on the large scale according to claim 1, wherein selecting the weak points of static voltage stability based on the static voltage stability index of the substations comprises:

obtaining an average value of the static voltage stability index according to the static voltage stability index of the substations; and selecting target substations with a static voltage stability index greater than the average value of the static voltage stability index from the substations, and identifying the target substations as the weak points of static voltage stability.

5. The method for configuring the reactive power capacity of the power grid to which the offshore wind power is connected on the large scale according to claim 1, wherein performing the N-2 fault analysis on each of the outgoing lines of the weak points of static voltage stability, calculating the relative dynamic voltage drop area index of the weak points of static voltage stability, and selecting the candidate reactive power compensation configuration nodes from the weak points of static voltage stability based on the relative dynamic voltage drop area index comprises:

determining an adjacent node of each of the weak points of static voltage stability and an N-2 fault disturbance operating condition of each of the weak points of static voltage stability, and calculating a relative dynamic voltage drop area index of each of the weak points of static voltage stability subjected to a fault disturbance; and sorting the relative dynamic voltage drop area index of the weak points of static voltage stability in descending order, and selecting a preset top percentage of the weak points of static voltage stability as the candidate reactive power compensation configuration nodes according to the sorted relative dynamic voltage drop area index.

6. The method for configuring the reactive power capacity of the power grid to which the offshore wind power is connected on the large scale according to claim 1, wherein using the minimum total cost of the reactive power compensation devices configured at the candidate reactive power compensation configuration nodes as the objective function, and the minimum total cost is as follows:

$$\min OF=\sum_{k=1}^{N_k} C_1 * Q_{c1\_k} + C_2 * Q_{c2\_k};$$

wherein OF represents a total cost of the reactive power compensation devices configured at the candidate reactive power compensation configuration nodes, $N_k$ represents a total number of the candidate reactive power compensation configuration nodes, $C_1$ represents a unit capacity construction cost of a static reactive power compensation device, $Q_{c1\_k}$ represents capacity of a static reactive power compensation device at a k-th candidate reactive power compensation configuration node, $C_2$ represents a unit capacity construction cost of a dynamic reactive power compensation device, and $Q_{c2\_k}$ represents capacity of a dynamic reactive power compensation device at the k-th candidate reactive power compensation configuration node.

7. The method for configuring the reactive power capacity of the power grid to which the offshore wind power is connected on the large scale according to claim 6, wherein the voltage stability constraints in the faulty state comprise:

performing an N-2 fault check on any important transmission channel in a system through the following formula:

$$\sum_{x=1}^{m}\int_{t_{end}^{x}}^{t_{start}^{x}} (0.8 - U_i^x(t))dt < A_{i,set};$$

wherein $A_{i,set}$ represents a threshold value of a critical transient voltage drop area of a node i, $$t_{start}^{x}$$

represents a moment at which a voltage drops to 0.8 p.u. for an x-th time under a certain fault, $$t_{end}^{x}$$

represents a moment at which the voltage is restored to above 0.8 p.u. for an x-th time under a certain fault, $$U_i^x(t)$$

represents a voltage trace curve of the node i with the voltage dropping below 0.8 p.u. for an x-th time under a certain fault, m represents a total number of curves with a voltage of below 0.8 p.u. under a certain fault, and x represents a number of times the voltage trace curve drops below 0.8 p.u. under a certain fault; and the other constraints comprise a capacity constraint for a reactive power compensation device; and the capacity constraint for the reactive power compensation device is as follows:

$$Q_{c1\_k\_min} < Q_{c1\_k} < Q_{c1\_k\_max};$$

$$Q_{c2\_k\_min} < Q_{c2\_k} < Q_{c2\_k\_max};$$

wherein $Q_{c1\_k\_min}$ represents a lower limit of the capacity configured for the static reactive power compensation device at the k-th candidate reactive power compensation configuration node, $Q_{c1\_k\_max}$ represents an upper limit of the capacity configured for the static reactive power compensation device at the k-th candidate reactive power compensation configuration node, $Q_{c2\_k\_min}$ represents a lower limit of the capacity configured for the dynamic reactive power compensation device at the k-th candidate reactive power compensation configuration node, and $Q_{c2\_k\_max}$ represents an upper limit of the capacity configured for the dynamic reactive power compensation device at the k-th candidate reactive power compensation configuration node.

8. The method for configuring the reactive power capacity of the power grid to which the offshore wind power is connected on the large scale according to claim 1, wherein the static voltage stability constraints comprise a power flow constraint and a node voltage constraint under a typical operating condition of offshore wind farms;

wherein the power flow constraint of the typical operating condition of the offshore wind farms is as follows:

$$\text{flow s.t.} = \begin{cases} P_p + \sum_{q\in\Phi_{(:,p)}} \left(P_{qp} - \frac{P_{qp}^2 + Q_{qp}^2}{U_q^2} R_{qp}\right) = \sum_{t\in\Phi_{(p,:)}} P_{pt}, & \forall\, p \in \Psi \\ Q_p + \sum_{q\in\Phi_{(:,p)}} \left(Q_{qp} - \frac{P_{qp}^2 + Q_{qp}^2}{U_q^2} X_{qp}\right) = \sum_{t\in\Phi_{(p,:)}} Q_{pt}, & \forall\, p \in \Psi \end{cases};$$

wherein $P_p$ represents a net injection amount of active power at a node p, $P_{qp}$ represents active power on a branch qp, $U_q$ represents a voltage of a node q, $Q_{qp}$ represents reactive power on the branch qp, $R_{qp}$ represents equivalent resistance of the branch qp, $P_{pt}$ represents active power on a branch pt, Ψ represents a set of alternating current nodes in a system, $\Phi_{(p,:)}$ represents a set of branches using the node p as a start node, $\Phi_{(:,p)}$ represents a set of branches using the node p as an end node, $Q_p$ represents a net injection amount of reactive power at the node p, $X_{qp}$ represents equivalent reactance of the branch qp, and $Q_{pt}$ represents reactive power on the branch pt; and the node voltage constraint is as follows:

$$-0.05 < \frac{U_q - U_{qN}}{U_{qN}} < 0.05;$$

wherein $U_{qN}$ represents a rated operating voltage of the node q.

9. The method for configuring the reactive power capacity of the power grid to which the offshore wind power is connected on the large scale according to claim 1, wherein solving the multi-type reactive power optimization configuration model to obtain the optimal reactive power capacity configuration result comprises:

solving the multi-type reactive power optimization configuration model through a particle swarm optimization algorithm based on the objective function under the static voltage stability constraints, the voltage stability constraints in the faulty state, and the other constraints to obtain optimal capacity of a static reactive power compensation device and optimal capacity of a dynamic reactive power compensation device configured at each of the candidate reactive power compensation configuration nodes.

10. A terminal for configuring reactive power capacity of a power grid to which offshore wind power is connected on a large scale, comprising: a memory, a processor, and a computer program stored in the memory and executable on the processor, wherein when executing the computer program, the processor performs steps of a method for configuring the reactive power capacity of the power grid to which the offshore wind power is connected on the large scale, wherein the method for configuring the reactive power capacity of the power grid to which the offshore wind power is connected on the large scale comprises:

calculating static voltage stability index of substations in a regional power grid to which the offshore wind power is connected on the large scale and at multiple points, and selecting weak points of static voltage stability based on the static voltage stability index of the substations;

performing an N-2 fault analysis on each of outgoing lines of the weak points of static voltage stability, calculating relative dynamic voltage drop area index of the weak points of static voltage stability, and selecting candidate reactive power compensation configuration nodes from the weak points of static voltage stability based on the relative dynamic voltage drop area index;

using a minimum total cost of reactive power compensation devices configured at the candidate reactive power compensation configuration nodes as an objective function, and establishing static voltage stability constraints, voltage stability constraints under faulty state, and other constraints to build a multi-type reactive power optimization configuration model considering large-scale connection of the offshore wind power; and solving the multi-type reactive power optimization configuration model to obtain an optimal reactive power capacity configuration result.

11. The terminal for configuring the reactive power capacity of the power grid to which the offshore wind power is connected on the large scale according to claim 10, wherein calculating the static voltage stability index of the substations in the regional power grid to which the offshore wind power is connected on the large scale and at the multiple points comprises:

performing a statistical calculation on transmission nodes corresponding to the substations in the regional power grid to which the offshore wind power is connected on the large scale and at the multiple points, and determining a typical operating condition of offshore wind farms;

building a node admittance matrix according to the transmission nodes, and generating a state equation of the typical operating condition of the offshore wind farms according to the node admittance matrix;

establishing a system power flow equation of the typical operating condition of the offshore wind farms based on the state equation of the typical operating condition of the offshore wind farms;

solving the system power flow equation of the typical operating condition of the offshore wind farms to obtain transmission apparent power of the substations; and calculating the static voltage stability index of the substations according to the transmission apparent power of the substations.

12. The terminal for configuring the reactive power capacity of the power grid to which the offshore wind power is connected on the large scale according to claim 11, wherein the static voltage stability index of the substations are calculated according to the transmission apparent power of the substations through the following formula:

$$L_j = \frac{\left|\sum_{i\in\alpha_L} \frac{Z_{ij}^* \tilde{S}_i}{U_i}\right|}{|U_j|};$$

wherein $L_j$ represents a static voltage stability index of a substation j, $$Z_{ij}^*$$

represents conjugation of mutual impedance between the substation j and a substation i adjacent to the substation j, $\tilde{S}_i$ represents transmission apparent power of the substation i adjacent to the substation j, $U_i$ represents a bus voltage vector of the substation i adjacent to the substation j, $|U_j|$ represents a voltage amplitude of the substation j, and $\alpha_L$ represents a set of substations adjacent to the substation j.

13. The terminal for configuring the reactive power capacity of the power grid to which the offshore wind power is connected on the large scale according to claim 10, wherein selecting the weak points of static voltage stability based on the static voltage stability index of the substations comprises:

obtaining an average value of the static voltage stability index according to the static voltage stability index of the substations; and selecting target substations with a static voltage stability index greater than the average value of the static voltage stability index from the substations, and identifying the target substations as the weak points of static voltage stability.

14. The terminal for configuring the reactive power capacity of the power grid to which the offshore wind power is connected on the large scale according to claim 10, wherein performing the N-2 fault analysis on each of the outgoing lines of the weak points of static voltage stability, calculating the relative dynamic voltage drop area index of the weak points of static voltage stability, and selecting the candidate reactive power compensation configuration nodes from the weak points of static voltage stability based on the relative dynamic voltage drop area index comprises:

determining an adjacent node of each of the weak points of static voltage stability and an N-2 fault disturbance operating condition of each of the weak points of static voltage stability, and calculating a relative dynamic voltage drop area index of each of the weak points of static voltage stability subjected to a fault disturbance; and sorting the relative dynamic voltage drop area index of the weak points of static voltage stability in descending order, and selecting a preset top percentage of the weak points of static voltage stability as the candidate reactive power compensation configuration nodes according to the sorted relative dynamic voltage drop area index.

15. The terminal for configuring the reactive power capacity of the power grid to which the offshore wind power is connected on the large scale according to claim 10, wherein using the minimum total cost of the reactive power compensation devices configured at the candidate reactive power compensation configuration nodes as the objective function, and the minimum total cost is as follows:

$$\min OF=\sum_{k=1}^{N_k} C_1 * Q_{c1\_k} + C_2 * Q_{c2\_k};$$

wherein OF represents a total cost of the reactive power compensation devices configured at the candidate reactive power compensation configuration nodes, $N_k$ represents a total number of the candidate reactive power compensation configuration nodes, $C_1$ represents a unit capacity construction cost of a static reactive power compensation device, $Q_{c1\_k}$ represents capacity of a static reactive power compensation device at a k-th candidate reactive power compensation configuration node, $C_2$ represents a unit capacity construction cost of a dynamic reactive power compensation device, and $Q_{c2\_k}$ represents capacity of a dynamic reactive power compensation device at the k-th candidate reactive power compensation configuration node.

16. The terminal for configuring the reactive power capacity of the power grid to which the offshore wind power is connected on the large scale according to claim 10, wherein the static voltage stability constraints comprise a power flow constraint and a node voltage constraint of a typical operating condition of offshore wind farms;

wherein the power flow constraint of the typical operating condition of the offshore wind farms is as follows:

$$\text{flow s.t.}=\begin{cases} P_p+\sum_{q\in\Phi_{(:,p)}}\left(P_{qp}-\frac{P_{qp}^2+Q_{qp}^2}{U_q^2}R_{qp}\right)=\sum_{t\in\Phi_{(p,:)}}P_{pt}, & \forall p\in\Psi \\ Q_p+\sum_{q\in\Phi_{(:,p)}}\left(Q_{qp}-\frac{P_{qp}^2+Q_{qp}^2}{U_q^2}X_{qp}\right)=\sum_{t\in\Phi_{(p,:)}}Q_{pt}, & \forall p\in\Psi \end{cases};$$

wherein $P_p$ represents a net injection amount of active power at a node p, $P_{qp}$ represents active power on a branch qp, $U_q$ represents a voltage of a node q, $Q_{qp}$ represents reactive power on the branch qp, $R_{qp}$ represents equivalent resistance of the branch qp, $P_{pt}$ represents active power on a branch pt, Ψ represents a set of alternating current nodes in a system, $\Phi_{(p,:)}$ represents a set of branches using the node p as a start node, $\Phi_{(:,p)}$ represents a set of branches using the node p as an end node, $Q_p$ represents a net injection amount of reactive power at the node p, $X_{qp}$ represents equivalent reactance of the branch qp, and $Q_{pt}$ represents reactive power on the branch pt; and the node voltage constraint is as follows:

$$-0.05<\frac{U_q-U_{qN}}{U_{qN}}<0.05;$$

wherein $U_{qN}$ represents a rated operating voltage of the node q.

17. The terminal for configuring the reactive power capacity of the power grid to which the offshore wind power is connected on the large scale according to claim 15, wherein the voltage stability constraints under faulty state comprise:

performing an N-2 fault check on any important transmission channel in a system through the following formula:

$$\sum_{x=1}^{m}\int_{t_{end}^x}^{t_{start}^x}(0.8-U_i^x(t))dt<A_{i,set};$$

wherein $A_{i,set}$ represents a threshold value of a critical transient voltage drop area of a node i, $$t_{start}^x$$

represents a moment at which a voltage drops to 0.8 p.u. for an x-th time under a certain fault, $$t_{end}^x$$

represents a moment at which the voltage is restored to above 0.8 p.u. for an x-th time under a certain fault, $$U_i^x(t)$$

represents a voltage trace curve of the node i with the voltage dropping below 0.8 p.u. for an x-th time under a certain fault, m represents a total number of curves with a voltage of below 0.8 p.u. under a certain fault, and x represents a number of times the voltage trace curve drops below 0.8 p.u. under a certain fault; and the other constraints comprise a capacity constraint for a reactive power compensation device; and the capacity constraint for the reactive power compensation device is as follows:

$$Q_{c1\_k\_min} < Q_{c1\_k} < Q_{c1\_k\_max};$$

$$Q_{c2\_k\_min} < Q_{c2\_k} < Q_{c2\_k\_max};$$

wherein $Q_{c1\_k\_min}$ represents a lower limit of the capacity configured for the static reactive power compensation device at the k-th candidate reactive power compensation configuration node, $Q_{c1\_k\_max}$ represents an upper limit of the capacity configured for the static reactive power compensation device at the k-th candidate reactive power compensation configuration node, $Q_{c2\_k\_min}$ represents a lower limit of the capacity configured for the dynamic reactive power compensation device at the k-th candidate reactive power compensation configuration node, and $Q_{c2\_k\_max}$ represents an upper limit of the capacity configured for the dynamic reactive power compensation device at the k-th candidate reactive power compensation configuration node.

18. The terminal for configuring the reactive power capacity of the power grid to which the offshore wind power is connected on the large scale according to claim 10, wherein solving the multi-type reactive power optimization configuration model to obtain the optimal reactive power capacity configuration result comprises:

solving the multi-type reactive power optimization configuration model through a particle swarm optimization algorithm based on the objective function under the static voltage stability constraints, the voltage stability constraints under faulty state, and the other constraints to obtain optimal capacity of a static reactive power compensation device and optimal capacity of a dynamic reactive power compensation device configured at each of the candidate reactive power compensation configuration nodes.

* * * * *